Feb. 17, 1931.    J. J. N. WISMER    1,792,956
COUPLING
Filed June 20, 1929

Inventor
Joseph J. N. Wismer,

By *Clarence A. O'Brien*
Attorney

Patented Feb. 17, 1931

1,792,956

UNITED STATES PATENT OFFICE

JOSEPH J. N. WISMER, OF ROSEDALE STATION, ALBERTA, CANADA

COUPLING

Application filed June 20, 1929. Serial No. 372,488.

This invention relates to new and useful improvements in couplings and the same has as its principal object the provision of a coupling capable of being quickly actuated for connecting or disconnecting various structures.

Another important object of the invention is to provide a coupling of the swivel type, which because of its extremely simple construction can be manufactured and sold inexpensively.

These and other important objects of the invention will become more readily apparent to the reader after considering the invention as described and claimed hereinafter.

Figure 1:
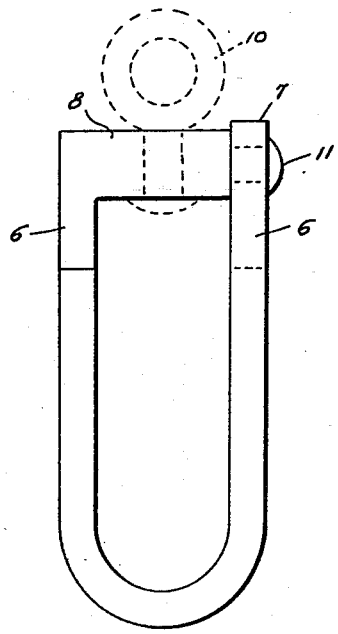
Figure 1 represents a side elevation of the improved coupling.
Figure 2:
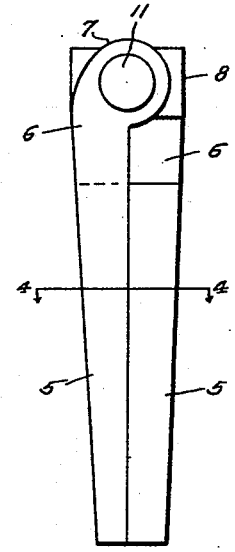
Figure 2 represents an edge elevation of the novel device.
Figure 3:
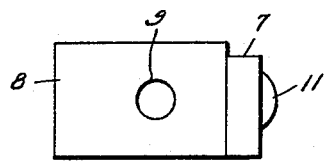
Figure 3 represents a top plan view of the coupling.
Figure 4:
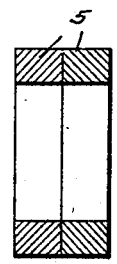
Figure 4 represents a cross sectional view, taken substantially on the line 4—4 of Figure 2.

Referring to the drawings wherein like numerals designate like parts, it will be seen that the present invention includes a pair of hook members 5—5 of substantial U-shaped construction. One leg of each hook member has an extension 6. The extension 6 of one hook member merges into an enlarged semi-circular offset head 7, while the extension 6 of the complementary hook member is provided with a laterally extending block 8 provided with an opening 9 through which the eye swivel 10 may be disposed. A rivet 11 pivotally connects the head 7 to the free end of the block 8 and by this arrangement of the hook members the same are disposed with their free ends abutting the extended legs of each other.

It will thus be seen that the hook members may be grasped by their bight portions and spaced apart so that a link may be engaged over the free ends of the hook members to embrace the bight portion of both of the hook members so that it will be practically impossible for the connection to become accidentally broken.

While the foregoing description has been in detail, it is to be understood that various changes in the specific shape, size and materials may be resorted to without departing from the spirit and scope of the invention as claimed herewith.

Having thus described my invention, what is claimed as new is:

A coupling comprising a pair of laterally engaging U-shaped members respectively formed with relatively long and short legs, the long leg of one member being provided at its end with a thickened block like portion of rectangular cross section extending perpendicular to the inner face of the leg and the long leg of the other member having an integrally formed relatively thickened eye portion at its end and offset to one side of the leg with the eye disposed in a plane at right angles to the normal plane of the member for engagement with the outer end face of the said block like portion of the companion leg and adapted to be located centrally of the side edges of the said block like portion, a rivet pivotally connecting the said eye portion to the said block like portion, and an eye swivel at the center of the said block like portion and extending upwardly therefrom.

In testimony whereof I affix my signature.

JOSEPH J. N. WISMER.